(12) United States Patent
Wei (10) Patent No.: US 12,169,296 B2
(45) Date of Patent: Dec. 17, 2024

(54) DISPLAY APPARATUS, PREPARATION METHOD THEREOF AND SMART MIRROR

(71) Applicant: BOE TECHNOLOGY GROUP CO., LTD., Beijing (CN)

(72) Inventor: Wei Wei, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 515 days.

(21) Appl. No.: 17/628,054

(22) PCT Filed: Apr. 29, 2021

(86) PCT No.: PCT/CN2021/090915
§ 371 (c)(1),
(2) Date: Jan. 18, 2022

(87) PCT Pub. No.: WO2021/233110
PCT Pub. Date: Nov. 25, 2021

(65) Prior Publication Data
US 2022/0276416 A1     Sep. 1, 2022

(30) Foreign Application Priority Data

May 18, 2020   (CN) .......................... 202010419154.X (51) Int. Cl.
*G02B 5/08*   (2006.01)
*G02B 1/14*   (2015.01)
(Continued)

(52) U.S. Cl.
CPC ............. *G02B 5/0816* (2013.01); *G02B 1/14* (2015.01); *G02B 5/003* (2013.01); *G02B 5/32* (2013.01)

(58) Field of Classification Search
None
See application file for complete search history.

(56) References Cited

U.S. PATENT DOCUMENTS

2017/0285382 A1   10/2017   Hasegawa et al.

FOREIGN PATENT DOCUMENTS

| CN | 103140791 A | 6/2013 |
|---|---|---|
| CN | 104950447 A | 9/2015 |

(Continued)

OTHER PUBLICATIONS

China Patent Office, First Office Action issued Mar. 9, 2022 for application No. CN202010419154.X.

*Primary Examiner* — Bao-Luan Q Le
*Assistant Examiner* — Daniel L Owens
(74) *Attorney, Agent, or Firm* — HOUTTEMAN LAW LLC (57) ABSTRACT

An embodiment of the present disclosure provides a display apparatus, including: a display panel and a functional substrate that is located on a light exit side of the display panel; the functional substrate includes: a transparent substrate configured to have a first total reflection angle; a specular reflection layer located on a side of the transparent substrate; and a holographic film layer located between the transparent substrate and the specular reflection layer and configured so that a part of incident light, of which the propagation direction faces towards the transparent substrate and the incident angle is within a first incident angle range, is diffracted and is emitted to the transparent substrate at a first exit angle, the first exit angle being greater than or equal to the first total reflection angle. Further provided are a preparation method for a display apparatus and a smart mirror.

11 Claims, 5 Drawing Sheets

(51) Int. Cl.
*G02B 5/00* (2006.01)
*G02B 5/32* (2006.01)

(56) References Cited

FOREIGN PATENT DOCUMENTS

| | | | |
|---|---|---|---|
| CN | 206548252 U | | 10/2017 |
| CN | 108402814 A | | 8/2018 |
| CN | 109198999 A | | 1/2019 |
| CN | 109884820 A | | 6/2019 |
| CN | 110806820 A | * | 2/2020 |
| JP | 7325222 A | | 12/1995 |
| JP | 2000321963 A | | 11/2000 |

* cited by examiner

DISPLAY APPARATUS, PREPARATION METHOD THEREOF AND SMART MIRROR

CROSS-REFERENCE TO RELATED APPLICATIONS

The present application claims the priority of the Chinese Patent Application No. 202010419154.X filed to the China National Intellectual Property Administration on May 18, 2020, the content of which is incorporated herein by reference in its entirety.

TECHNICAL FIELD

The present disclosure relates to the field of display technology, in particular to a display apparatus, a preparation method thereof and a smart mirror.

BACKGROUND

Smart mirror is a multifunctional terminal device that integrates mirror function, display function, and interactive function. Without being turned on, a smart mirror is an ordinary mirror, but once the system is powered on, it is a smart display that can sense the arrival of people and automatically wake up the screen. At this time, it becomes a smart display that can interact with users in a variety of ways. In practical applications, it is found that there is a serious ghosting problem when the smart mirror is used as a smart display.

SUMMARY

The present disclosure seeks solve at least one of the technical problems in the existing technology, and provides a display apparatus, a preparation method thereof and a smart mirror.

In a first aspect, an embodiment of the present disclosure provides a display apparatus, including: a display panel and a functional substrate that is located on a light exit side of the display panel, the functional substrate including: a transparent substrate configured to have a first total reflection angle on an inner surface of a side far from the display panel; a specular reflection layer located on a side of the transparent substrate; and a holographic film layer located between the transparent substrate and the specular reflection layer and configured so that a part of incident light, of which a propagation direction faces towards the transparent substrate and an incident angle is within a first incident angle range, is diffracted and is emitted to the transparent substrate at a first exit angle, the first exit angle being greater than or equal to the first total reflection angle.

In some embodiments, a light absorbing layer is formed on a side surface of the transparent substrate.

In some embodiments, an upper limit value of a predetermined incident angle range is greater than or equal to a predetermined total reflection angle.

In some embodiments, a touch substrate and a cover plate are sequentially disposed on a light exit side of the display panel in a direction away from the display panel, the touch substrate including: a first base substrate and a touch function structure that is located on a side of the first base substrate close to the display panel; the specular reflection layer and the holographic film layer are located between the first base substrate and the cover plate, and the holographic film layer is attached to the cover plate; and the transparent substrate is the cover plate.

In some embodiments, a touch substrate is disposed on a light exit side of the display panel, the touch substrate including: a first base substrate and a touch function structure that is located on a side of the first base substrate close to the display panel; the specular reflection layer and the holographic film layer are located on a side of the first base substrate far from the display panel, and the holographic film layer is attached to the first base substrate; and the transparent substrate is the first base substrate.

In some embodiments, an encapsulation layer is disposed on a side of the functional substrate far from the display panel, the encapsulation layer including: a protective layer and/or a waterproof layer; wherein, when the encapsulation layer simultaneously includes the protective layer and the waterproof layer, the waterproof layer is located on a side of the protective layer far from the display panel.

In some embodiments, a light absorbing layer is formed on side surfaces of the cover plate, the holographic film layer, the specular reflection layer, and the touch substrate.

In a second aspect, an embodiment of the present disclosure further provides a smart mirror, including: a display apparatus as provided in the first aspect.

In a third aspect, an embodiment of the present disclosure further provides a preparation method for a display apparatus, which may be used for preparing the display apparatus in the first aspect, including: preparing a display panel; preparing a functional substrate, the functional substrate including: a transparent substrate, a specular reflection layer and a holographic film layer, the transparent substrate being configured to have a first total reflection angle on an inner surface of a side far from the display panel, the specular reflection layer being located on a side of the transparent substrate, the holographic film layer being located between the transparent substrate and the specular reflection layer and configured so that a part of incident light, of which the propagation direction faces towards the transparent substrate and the incident angle is within a first incident angle range, is diffracted and is emitted to the transparent substrate at a first exit angle, the first exit angle being greater than or equal to the first total reflection angle; and assembling the functional substrate to the light exit side of the display panel.

In some embodiments, a step of forming the holographic film layer in the process of preparing the functional substrate includes: forming a photosensitive material layer on a side of the second base substrate; irradiating the photosensitive material layer with object light and reference light, utilizing interference of the object light and the reference light to make the photosensitive material layer record a propagation direction of interference light, wherein an included angle between the object light and a plane where the photosensitive material layer is located is maintained at the first exit angle, and an included angle between the reference light and the plane where the photosensitive material layer is located is gradually increased from a lower limit value of the first incident angle range to an upper limit value of the first incident angle range.

In some embodiments, in a process of preparing the functional substrate the transparent substrate is disposed on a side of the holographic film layer far from the second base substrate, and the specular reflection layer is disposed on a side of the second base substrate far from the holographic film layer.

DETAIL DESCRIPTION OF EMBODIMENTS

In order to make those skilled in the art better understand the technical solution of the present disclosure, a display apparatus, a preparation method thereof, and a smart mirror according to the present disclosure are described in detail below with reference to the accompanying drawings.

Figure 1:
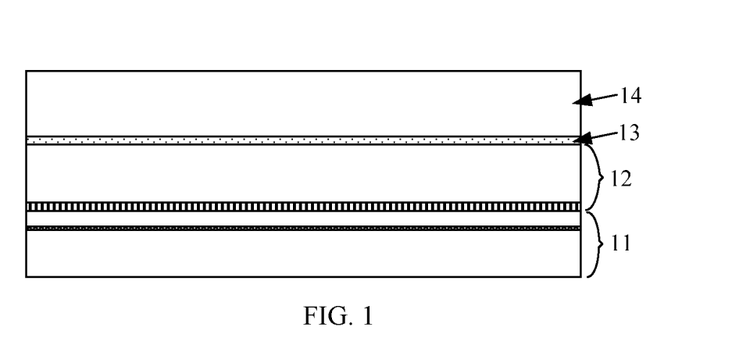
FIG. 1 is a schematic structural diagram of a smart mirror in the existing technology.

FIG. 1 is a schematic structural diagram of a smart mirror in the existing technology, and as shown in FIG. 1, the smart mirror includes a display panel 11, a touch substrate 12 located on a light exit side of the display panel 11, a specular reflection layer 13, and a cover plate 14.

When the display panel 11 does not display, the specular reflection layer 13 in the smart mirror can perform specular reflection, and the smart mirror is used as an ordinary mirror; when the display panel 11 displays, light emitted from the display panel 11 sequentially passes through the touch substrate 12, the specular reflection layer 13 and the cover plate 14 and is emitted out, the smart mirror is used as a smart display, and a user can realize interaction based on the touch substrate 12.

Figure 2:
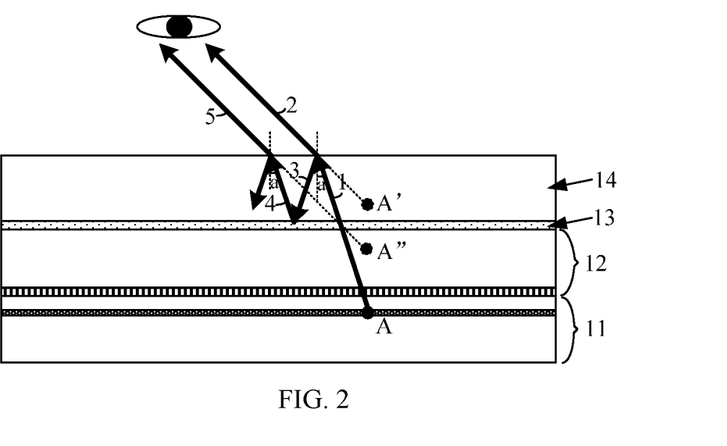
FIG. 2 is a schematic diagram of a light path when the smart mirror shown in FIG. 1 is used as a smart display.

FIG. 2 is a schematic diagram of a light path when the smart mirror shown in FIG. 1 is used as a smart display. As shown in FIG. 2, taking a part of light emitted from a point A on the display panel 11 as an example, the part of light 1 sequentially passes through the touch substrate 12 and the specular reflection layer 13 and then enters into the cover plate 14. After the light 1 reaches a side surface of the cover plate 14 far from the display panel 11, a part of light is refracted out of the cover plate 14 to form refracted light 2, another part of light is reflected on this surface to form reflected light 3, and the reflected light 3 is emitted to the specular reflection layer 13 and is reflected again on the surface of the specular reflection layer 13 to form reflected light 4; after the reflected light 4 reaches the side surface of the cover plate 14 far from the display panel 11, a part of the reflected light is refracted out of the cover plate 14 to form refracted light 5; both the refracted light 2 and the refracted light 5 will be observed by the human eye, i.e. the primary image A' and the secondary image A" will be observed by the human eye, i.e. a ghosting will appear.

In the existing technology, taking the case where when the incident angle is a the light transmittance and light reflectance on the side surface of the cover plate 14 far from the specular reflection layer 13 are m % and 1-m % respectively and the light transmittance and light reflectance of the reflection layer 13 are n % and 1-n % respectively as an example for exemplary description, m and n are both greater than 0 and less than 1. Assuming that the brightness of the light 1 when reaching the side surface of the cover plate 14 far from the display panel 11 is Q, the brightness of the light 2 to light 5 is as follows:

The brightness of the light 2 is: Q*m;
The brightness of the light 3 is: Q*(1-m);
The brightness of the light 4 is: Q*(1-m)*(1-n);
The brightness of the light 5 is: Q*(1-m)*(1-n)*m;
The brightness ratio of light 2 to light 5 is:

$$\frac{1}{(1-m)*(1-m)}.$$

The smaller the ratio of the brightness corresponding to the refracted light 2 to the brightness corresponding to the refracted light 5 is (the smaller the contrast between the pixel A' and the image A"), the more obvious the ghosting effect will be. In addition, the larger the viewing angle of the user, the larger the distance between the image A' and the image A", and the more obvious the ghosting effect.

In order to solve the ghosting problem in the existing technology, the technical scheme of the disclosure provides a display apparatus, a preparation method thereof and a smart mirror.

Figure 3:
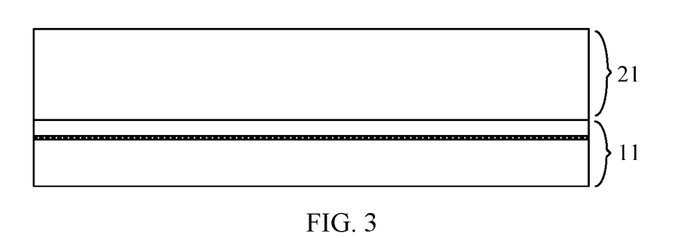
FIG. 3 is a schematic structural diagram of a display panel according to an embodiment of the present disclosure.
Figure 4:
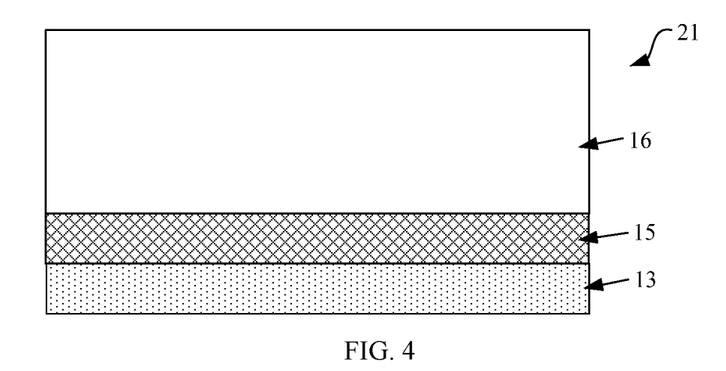
FIG. 4 is a schematic structural diagram of a functional substrate of the display panel shown in FIG. 3.
Figure 5:
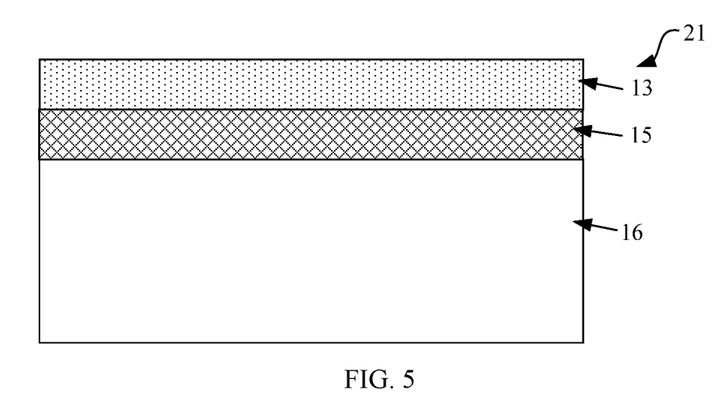
FIG. 5 is another schematic structural diagram of the functional substrate in the display panel shown in FIG. 3.

FIG. 3 is a schematic structural diagram of a display panel according to an embodiment of the disclosure, FIG. 4 is a schematic structural diagram of a functional substrate in the display panel shown in FIG. 3, and FIG. 5 is another schematic structural diagram of the functional substrate in the display panel shown in FIG. 3. As shown in FIGS. 3 to 5, the display apparatus includes: a display panel 11 and a functional substrate 21 that is located on a light exit side of the display panel 11, the functional substrate 21 including: a transparent substrate 16 configured to have a predetermined total reflection angles on an inner surface of a side far from the display panel 11; a specular reflection layer 13 located on a side of the transparent substrate 16; and a holographic film layer 15 located between the transparent substrate 16 and the specular reflection layer 13 and configured so that a part of incident light, of which the propagation direction faces towards the transparent substrate 16 and the incident angle is within a first incident angle range, is diffracted and is emitted to the transparent substrate 16 at a first exit angle, the first exit angle being greater than or equal to the first total reflection angle.

The predetermined total reflection angle of the inner surface on a side of the transparent substrate 16 far from the display panel 11 is determined by the material of the transparent substrate 16 and the material of a medium contacting the side surface of the transparent substrate 16 far from the display panel 11; the refractive index of the medium contacting the side surface of the transparent substrate 16 far from the display panel 11 should be smaller than the refractive index of the transparent substrate 16. In some embodiments, the transparent substrate 16 is a glass substrate.

The specular reflection layer 13 is a film layer having a transflective function, that is, the specular reflection layer 13 not only reflects light but also transmits light (the specular reflection layer 13 has a certain light transmittance). In some embodiments, the specular reflective layer 13 is made of a non-metallic reflective material. For example, the specular reflection layer 13 is composed of a titanium dioxide layer of high refractive index and a silicon dioxide layer of low refractive index that are stacked alternately, thus a transflective effect can be achieved.

The principle of eliminating ghosting in the present disclosure will be described in detail below with reference to the accompanying drawings. For convenience of description, two directions "up" and "down" are introduced in the description of the embodiments of the present disclosure. With reference to the display panel 11, a direction at the light exit side of the display panel 11 and far from the display panel 11 is referred to as "up" in the figures, and a direction at the light exit side of the display panel 11 and close to the display panel 11 is referred to as "down".

In the embodiment of the present disclosure, the stacking of the transparent substrate 16, the specular reflection layer 13, and the holographic film layer 15 in the functional substrate 21 are in two manners: 1) referring to FIG. 4, sequentially stacked from top to bottom are the transparent substrate 16, the holographic film layer 15 and the specular reflection layer 13; 2) referring to FIG. 5, sequentially stacked from top to bottom are the specular reflection layer 13, the holographic film layer 15 and the transparent substrate 16.

Figure 6:
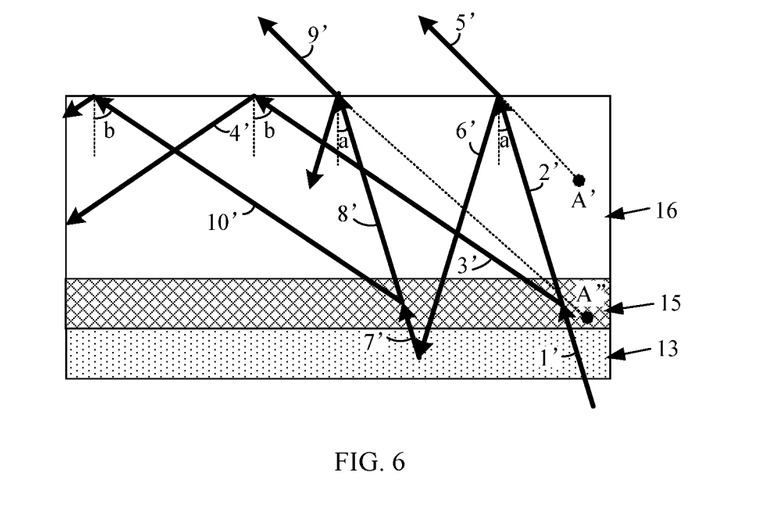
FIG. 6 is a schematic diagram illustrating a light path of light from the display panel emitted to the functional substrate shown in FIG. 4.

FIG. 6 is a schematic diagram of a light path when light from the display panel is emitted to the functional substrate shown in FIG. 4. As shown in FIG. 6, for convenience of description, the change of a propagation angle caused by the refraction of the light at an interface between the transparent substrate 16 and the holographic film layer 15 and an interface between the holographic film layer 15 and the specular reflection layer 13 is not considered.

The light 1' emitted from the display panel 11 passes through the specular reflection layer 13 and is emitted to the holographic film layer 15 at an incident angle a (assuming that the incident angle a is smaller than the predetermined total reflection angle P and is within the predetermined incident angle range), at this time, a part of the light 1' is transmitted in its original propagation direction to form light 2', and another part of the light 1' is diffracted under the effect of the holographic film layer 15 and is emitted to the transparent substrate 16 at a predetermined exit angle b to form light 3'. Because the predetermined exit angle b is greater than the predetermined total reflection angle P, the light 3' is totally reflected on the inner surface of a side of the transparent substrate 16 far from the display panel to form light 4'. Meanwhile, when the light 2' reaches the inner surface of a side of the transparent substrate far from the display panel, a part of the light is refracted to form light 5', another part of the light is reflected to form light 6'. The light 6' passes through the holographic film layer 15 (the light in a propagation direction far from the transparent substrate 16 does not diffract when passing through the holographic film layer 15) and then reaches the specular reflection layer 13, and then is reflected on the specular reflection layer 13 to form light 7'. The light 7' is emitted to the holographic film layer 1 at an incident angle a, at the moment, a part of the light 7' is transmitted in the original propagation direction to form light 8', another part of the light 7' is diffracted under the effect of the holographic film layer 15, and is emitted to the transparent substrate 16 at a predetermined exit angle b to form light 10'. Because the predetermined exit angle b is greater than the predetermined total reflection angle P, the light 10' is totally reflected on the inner surface of a side of the transparent substrate far from the display panel. When the light 8' reaches the inner surface of a side of the transparent substrate 16 far from the display panel, a part of the light is refracted to form light 9', and another part of the light is reflected.

Both the refracted light 5' and the refracted light 9' will be observed by the human eye, i.e. image A' and image A" will be observed by the human eye.

By taking the case where when the incident angle is a the light transmittance and light reflectance on the side surface of the transparent substrate 16 far from the specular reflection layer 13 are m and 1-m respectively, the light transmittance and light reflectance of the reflection layer 13 are n and 1-n respectively, the light transmittance on the holographic film layer is s, and the light diffraction rate of the light generating diffraction effect is 1-s as an example for exemplary description, m, n, and s are all greater than 0 and less than 1. Assuming that the brightness of the light 1' when reaching the holographic film layer is Q, the brightness of the light 2' to the light 10' is as follows:

The brightness of the light 2' is: $Q*s$;
The brightness of the light 3' is: $Q*(1-s)$;
The brightness of the light 4' is: $Q*(1-s)*(1-m)$;
The brightness of the light 5' is: $Q*s*m$;
The brightness of the light 6' is: $Q*s*(1-m)$;
The brightness of the light 7' is: $Q*s*(1-m)*(1-n)$;
The brightness of the light 8' is: $Q*s*(1-m)*(1-n)*s$;
The brightness of the light 9' is: $Q*s*(1-m)*(1-n)*s*m$;
The brightness of the light 10' is: $Q*s*(1-m)*(1-n)*(1-s)$;
The ratio of the brightness of the light 5' to the brightness of the light 9' is $$\frac{1}{s*(1-m)*(1-n)}.$$

Since m, n and s are all greater than 0 and less than 1, so $$\frac{1}{s*(1-m)*(1-n)} > \frac{1}{(1-m)*(1-n)}.$$

Therefore, compared with the existing technology, the technology of the present disclosure can increase the brightness ratio (contrast) of the primary image A' and the secondary image A" observed by human eyes and reduce the ghosting effect.

It should be noted that, in the case shown in FIG. 4 and FIG. 6, in order to prevent the light 6' from being totally reflected between the holographic film layer 15 and the transparent substrate 16 and thus cannot reach the specular reflection layer 13, in some embodiments, the refractive index of the holographic film layer 15 is greater than or equal to the refractive index of the transparent substrate 16, and when the light 6' passes through the interface between the transparent substrate and the holographic film layer, the light always enters into an optically denser medium from an optically thinner medium, and thus total reflection does not occur.

Figure 7:
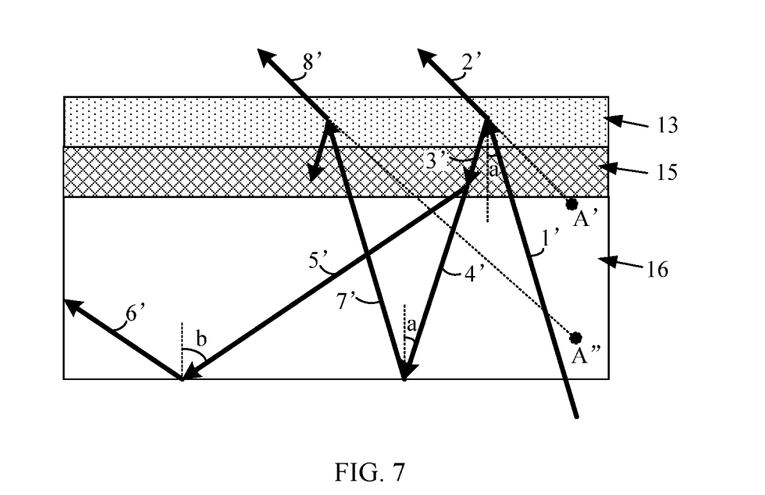
FIG. 7 is a schematic diagram showing a light path of light from the display panel emitted to the functional substrate shown in FIG. 5.

FIG. 7 is a schematic diagram of a light path when light from the display panel is emitted to the functional substrate shown in FIG. 5. As shown in FIG. 7, for convenience of description, the change of the propagation angle caused by refraction of the light at an interface between the transparent substrate 16 and the holographic film layer 15 and an interface between the holographic film layer 15 and the specular reflection layer 13 is not considered.

The light 1' emitted from the display panel 11 passes through the transparent substrate 16 and the holographic film layer 15 (the light in a propagation direction away from the display panel 11 does not diffract when passing through the holographic film layer 15) and enters into the specular reflection layer 13, and the light 1' is emitted to the specular reflection layer 13 at an incident angle a. Assuming that the predetermined total reflection angle corresponding to the inner surface of a side of the transparent substrate 16 far from the display panel 11 is P, the incident angle a is smaller than the predetermined total reflection angle P and is within a predetermined incident angle range. At this time, a part of the light 1' will be refracted to form refracted light 2', another part of the light 1' will be reflected to form light 3', the light 3' will be emitted to the holographic film layer 15 at the incident angle a. A part of the light 3' will be transmitted in its original propagation direction to form light 4', another part of the light 3' will be diffracted under the effect of the holographic film layer 15 and is emitted at a predetermined exit angle b into the transparent substrate 16 to form light beam 5', the light beam 5' is reflected (may or may not be totally reflected) on a side surface of the transparent substrate 16 far from the holographic film 15 to form light 6, the light 6' is emitted at the predetermined exit angle b to a side surface of the transparent substrate 16 far from the display panel. Because the predetermined exit angle b is greater than the predetermined total reflection angle P, the light 6' will be totally reflected on the side surface of the transparent substrate 16 far from the display panel. The light 4' is reflected on the side surface the transparent substrate 16 far from the holographic film layer 15 to form light 7', the light 7' passes through the transparent substrate 16 and the holographic film layer 15 (the light in a propagation direction away from the display panel 11 does not diffract when passing through the holographic film layer 15) and enters into the specular reflection layer 13, and the light 7' is emitted to the specular reflection layer 13 at an incidence angle a. A part of the light 7' will be refracted to form refracted light 8', and another part of the light 7' will be reflected.

By taking the case where when the incident angle is a the light transmittance and light reflectance on the side surface of the transparent substrate 16 far from the specular reflection layer 13 are m and 1-m respectively, the light transmittance and light reflectance of the reflection layer 13 are n and 1-n respectively, the light transmittance on the holographic film layer is s, and the light diffraction rate of the light generating diffraction effect is 1-s as an example for exemplary description, m, n, and s are all greater than 0 and less than 1. Assuming that the brightness of the light 1' when reaching the specular reflection film 13 is Q, then:

The brightness of the light 2' is: Q*n;
The brightness of the light 3' is: Q*(1-n);
The brightness of the light 4' is: Q*(1-n)*s;
The brightness of the light 5' is: Q*(1-n)*(1-s);
The brightness of the light 6' is determined by the brightness of the light 5', the angle b, the material of the transparent substrate 16, the material of the medium in contact with the side surface of the transparent substrate 16 far from the specular reflection layer, and the like; when the light 5' is totally reflected, the brightness of the light 6' is equal to the brightness of the light 5'.

The brightness of the light 7' is: Q*(1-n)*s*(1-m);
The brightness of the light 8' is: Q*(1-n)*s*(1-m)*n;
The ratio of the brightness of the light 2' to the brightness of the light 8' is $$\frac{1}{s*(1-m)*(1-n)}.$$

Since m, n and s are all greater than 0 and less than 1, so $$\frac{1}{s*(1-m)*(1-n)} > \frac{1}{(1-m)*(1-n)}.$$

Therefore, compared with the existing technology, the technology of the present disclosure can increase the brightness ratio (contrast) of the primary image A' and the secondary image A" observed by human eyes and reduce the ghosting effect.

In the schemes shown in FIG. 5 and FIG. 7, since the holographic film layer 15 is in contact with the side surface of the transparent substrate 16 far from the display panel 11, in order to ensure that the light 5 is totally reflected on the inner surface of the side of the transparent substrate 16 far from the display panel 11, the refractive index of the holographic film layer 15 should be smaller than the refractive index of the touch substrate 12.

It should be noted that the predetermined incident angle range in the embodiment of the present disclosure may be set according to practical needs.

In some embodiments, considering that the ghosting problem is relatively heavy when the human eyes watch at a large angle in the existing technology, in order to solve the problem, it should be preferentially ensured that light entering at a large incident angle a is performed with "ghosting elimination", in which case the upper limit value of the predetermined incident angle range is greater than or equal to the predetermined total reflection angle. Optionally, an upper limit value of the predetermined incident angle range is equal to the predetermined total reflection angle.

In some embodiments, it is possible that the lower limit of the predetermined incident angle range is smaller than the predetermined total reflection angle. As an alternative, the lower limit of the predetermined incident angle range is set to 0°, and at this time the "ghost elimination" may be performed for light entering at an incident angle a ranging from 0 to the predetermined total reflection angle. In practical applications, considering that ghosting is relatively light when human eyes watch at a small angle in the existing technology, the light entering at a small incident angle a may not be subjected to the "ghost elimination" process, and the lower limit value of the predetermined incident angle range may be set according to practical needs; for example, the lower limit value of the predetermined incident angle range is set to 10°.

With continued reference to FIGS. 4 and 5, to avoid light leakage from the side surface of the transparent substrate 16, in some embodiments, a light absorbing layer 17 is formed on the side surface of the transparent substrate 16 for absorbing light reaching the side surface of the transparent substrate 16.

Figure 8:
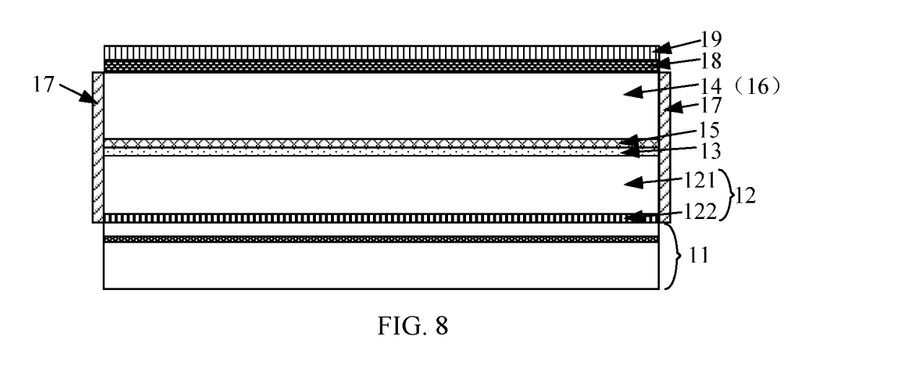
FIG. 8 is a schematic structural diagram of another display apparatus according to an embodiment of the present disclosure.

FIG. 8 is a schematic structural diagram of another display apparatus according to an embodiment of the present disclosure. As shown in FIG. 8, the display apparatus provided in this embodiment is a specific scheme of the display apparatus shown in FIG. 3. Specifically, a touch substrate 12 and a cover plate 14 are sequentially disposed at a light exit side of the display panel 11 in a direction away from the display panel 11. The touch substrate 12 includes: a first base substrate 121 and a touch function structure 122 located on a side of the first base substrate 121 close to the display panel 11; the specular reflection layer 13 and the holographic film layer 15 are located between the first base substrate 121 and the cover plate 14, and the holographic film layer 15 is closer to the cover plate 14 than the specular reflection layer 13 (for example, as shown in FIG. 8, the holographic film layer 15 is attached below the cover plate 14); the transparent substrate 16 is the cover plate 14. At this time, the cover plate 14, the holographic film layer 15 and the specular reflection layer 13 correspond to the functional substrate 21 shown in FIG. 4.

In the technical scheme of the present disclosure, any conventional touch function structure may be adopted as the touch function structure 122, for example, the touch function structure 122 is a capacitive touch structure (self-capacitive touch or mutual capacitive touch), a resistive touch structure, or an ultrasonic touch structure. The technical scheme of the present disclosure does not limit the specific structure of the touch function structure 122.

In some embodiments, in the process of preparing the display apparatus shown in FIG. 8, it is necessary that the holographic film layer 15 is separately prepared in advance, and then the holographic film layer 15 is attached to the specular reflection layer 13 and the cover plate 14 respectively. Specifically, the holographic film layer 15 is prepared on a base substrate (referred to as a second base substrate) to obtain a holographic substrate, and then the entire holographic substrate is attached to the specular reflection layer 13 and the cover plate 14, so that a second base substrate (not shown in FIG. 8) will exist between the holographic film layer 15 and the specular reflection layer 13 in the finally-manufactured display panel 11.

In some embodiments, an encapsulation layer is disposed on a side of the cover plate 14 far from the display panel 11 for encapsulating the functional substrate 21.

In some embodiments, the encapsulation layer includes: a protective layer 18 and/or a waterproof layer 19.

The protective layer 18 is made of a high-hardness and transparent material for protecting the functional substrate 21; in some embodiments, the material of the protective layer 18 includes: at least one of silicon dioxide and silicon nitride.

The waterproof layer 19 is configured to prevent the functional substrate 21 from being corroded by humid air, sweat, moisture, or the like. In some embodiments, the waterproof layer 19 is mainly composed of the following raw materials in percentage by weight: 25%~65% of nano fluorine polymer particles (with a particle diameter between 50 and 100 nm), 0.05%~10% of polysiloxane, 4%~20% of polyurethane, 30%~75% of unscented solvent, 1%~20% of wollastonite fiber, 0.2%~10% of nano titanium dioxide and 0.5%~10% of nano zinc oxide. In the process of preparing the waterproof layer 19, waterproof liquid may be prepared according to the above proportion, then the waterproof liquid is sprayed on the substrate through ultrasonic oscillation in a vacuum dust-free environment, and finally defoaming and laser annealing treatment are performed to obtain a nanoscale film (with a thickness range of 5-30 nm) capable of serving as waterproof encapsulation.

It should be noted that the figures only show the case where the encapsulation layer simultaneously includes the protective layer 18 and the waterproof layer 19, in which case the waterproof layer 19 is located on the side of the protective layer 18 far from the display panel 11.

In the embodiment, in order to prevent light leakage from the side surface of the holographic film layer 15, the specular reflection layer 13 and the touch substrate 12, the light absorbing layer 17 also covers the side surfaces of the holographic film layer 15, the specular reflection layer 13 and the touch substrate 12.

Figure 9:
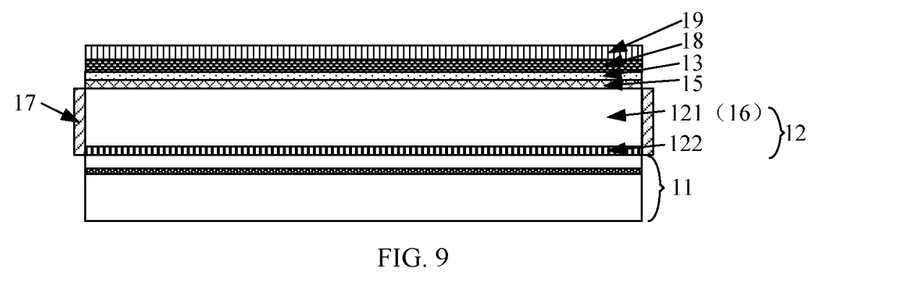
FIG. 9 is a schematic structural diagram of another display apparatus according to an embodiment of the present disclosure.

FIG. 9 is a schematic structural diagram of another display apparatus according to an embodiment of the present disclosure. As shown in FIG. 9, the display apparatus according to this embodiment is a specific scheme based on the display apparatus shown in FIG. 3. Specifically, a touch substrate 12 is disposed at a light exit side of a display panel 11, and the touch substrate 12 includes: a first base substrate 121 and a touch function structure 122 located on a side of the first base substrate 121 close to the display panel 11; the specular reflection layer 13 and the holographic film layer 15 are located at the side of the first base substrate 121 far from the display panel 11, and the holographic film layer 15 is closer to the first base substrate 121 than the specular reflection layer 13 (as shown in FIG. 9, the holographic film layer 15 is attached above the first base substrate 121); the transparent substrate 16 is the first base substrate 121. At this time, the first base substrate 121, the holographic film layer 15 and the specular reflection layer 13 correspond to the functional substrate 21 shown in FIG. 5.

Unlike the embodiment shown in FIG. 8, the display apparatus according to this embodiment does not have the cover plate 14, which is beneficial to the lightness and thinness of the display apparatus.

In some embodiments, an encapsulation layer is disposed on the side of the specular reflection layer 13 far from the display panel 11. For the detailed description of the encapsulation layer, reference may be made to the foregoing contents, and details are not repeated here.

The embodiment of the present disclosure further provides a smart mirror, the smart mirror including the display apparatus according to the foregoing embodiment. For the specific description of the display apparatus, reference may be made to the foregoing contents, which is not repeated herein.

Figure 10:
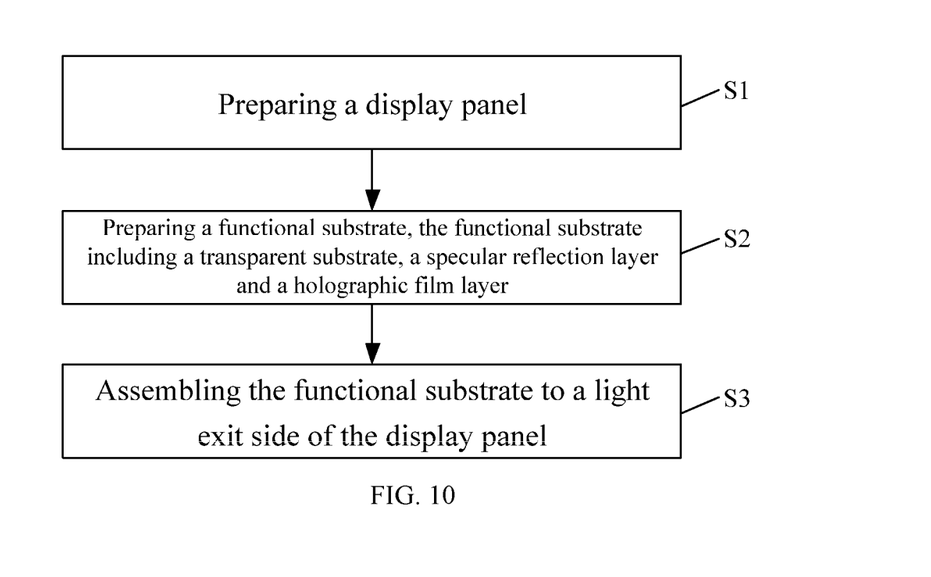
FIG. 10 is a flowchart of a preparation method for a display apparatus according to an embodiment of the present disclosure.

FIG. 10 is a flowchart of a preparation method for a display apparatus according to an embodiment of the present disclosure. As shown in FIG. 10, the preparation method is for preparing the display apparatus according to the previous embodiment, and the preparation method includes: Step S1, Step S2 and Step S3.

In Step S1, preparing a display panel.

The display panel may be a liquid crystal display panel or an organic light emitting diode display panel.

In Step S2, preparing a functional substrate, the functional substrate including: a transparent substrate, a specular reflection layer and a holographic film layer.

The transparent substrate is configured to have a predetermined total reflection on an inner surface of a side far from the display panel, the specular reflection layer is located on a side of the transparent substrate, and the holographic film layer is located between the transparent substrate and the specular reflection layer, the holographic film layer being configured so that incident light, of which the propagation direction faces towards the display panel and the incident angle is within a predetermined incident angle range, is diffracted, and that a predetermined exit angle is presented between light emitted from the holographic film layer to the transparent substrate and the side surface of the transparent substrate far from the display panel, the predetermined exit angle being greater than or equal to the predetermined total reflection angle.

In Step S3, mounting the functional substrate to the light exit side of the display panel.

Figure 11:
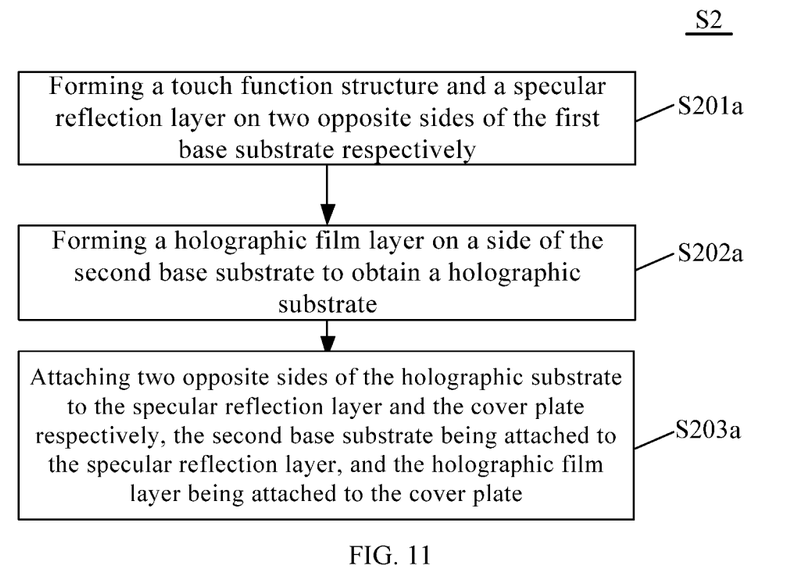
FIG. 11 is a flowchart of an alternative implementation manner for implementing step S2 in an embodiment of the present disclosure.

FIG. 11 is a flowchart of an alternative implementation manner for implementing step S2 in the embodiment of the present disclosure. As shown in FIG. 11, in some embodiments, when the display apparatus shown in FIG. 8 is adopted as the display apparatus, step S2 includes: Step S201a, Step S202a, and Step S203a.

In Step S201a, forming a touch function structure and a specular reflection layer on two opposite sides of the first base substrate respectively.

In Step S202a, forming a holographic film layer on a side of the second base substrate to obtain a holographic substrate.

In Step S203a, attaching two opposite sides of the holographic substrate to the specular reflection layer and the cover plate respectively, the second base substrate being attached to the specular reflection layer, and the holographic film layer being attached to the cover plate.

That is, in the display apparatus shown in FIG. 8, a second base substrate is formed between the holographic film layer and the specular reflection layer.

In some embodiments, the holographic substrate is respectively attached to the specular reflection layer and the cover plate by a light-curing adhesive.

Figure 12:
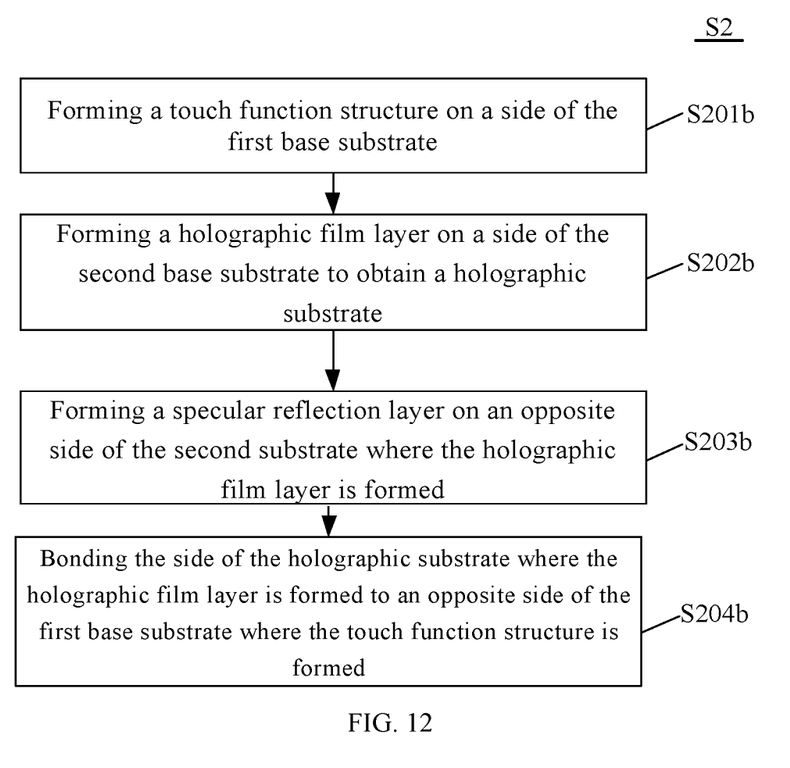
FIG. 12 is a flowchart of another alternative implementation manner for implementing step S2 in an embodiment of the present disclosure.

FIG. 12 is a flowchart of another alternative implementation manner for implementing step S2 in the embodiment of the present disclosure. As shown in FIG. 12, in some embodiments, when the display apparatus shown in FIG. 9 is adopted as the display apparatus, step S2 includes: Step S201b, Step S202b, Step S203b, and Step S204b.

In Step S201b, forming a touch function structure on a side of the first base substrate.

In Step S202b, forming a holographic film layer on a side of the second base substrate to obtain a holographic substrate.

In Step S203b, forming a specular reflection layer on an opposite side of the second substrate where the holographic film layer is formed.

In Step S204b, bonding the side of the holographic substrate where the holographic film layer is formed to an opposite side of the first base substrate where the touch function structure is formed.

That is, in the display apparatus shown in FIG. 9, a second base substrate is formed between the holographic film layer and the specular reflection layer.

In steps S202a and S201b, the process of preparing a holographic film layer is as follows: firstly, forming a photosensitive material layer on a side of the second base substrate; then, irradiating the photosensitive material layer with object light and reference light, utilizing the interference of the object light and the reference light to make the photosensitive material layer record a propagation direction of interference light thereof, an included angle between the object light and the plane where the photosensitive material layer is located is maintained at a predetermined incident angle, and an included angle between the reference light and the plane where the photosensitive material layer is located is gradually increased from a lower limit value of the predetermined incident angle range to an upper limit value of the predetermined incident angle range.

In some embodiments, the thickness range of the photosensitive material layer includes: 5 um~200 um. Since the photosensitive material layer performs recording layer by layer in the process of recording the interference light, the photosensitive material layer may be set according to the difference between the upper limit value and the lower limit value of the predetermined incident angle range, and the larger the difference is set, the larger the required thickness of the photosensitive material layer is.

In some embodiments, the photosensitive material layer includes the following chemical components: matrix resin, active fluororesin, silane-coupled nano particles, active monomer, an initiation system, a plasticizer and a solvent.

In some embodiments, the matrix resin, the active fluororesin, the silane-coupled nanoparticle, the active monomer, the initiation system, and the plasticizer are as follows by weight percentage in terms of solid content: 10 wt %~90 wt % of matrix resin, 3 wt %~20 wt % of active fluororesin, 1 wt %~10 wt % of silane-coupled nanoparticles, 5 wt %~60 wt % of active monomer, 1 wt %~10 wt % of initiation system and 2 wt %~10 wt % of plasticizer.

In some embodiments, the photopolymer coating further includes other additives, and the matrix resin, the active fluororesin, the silane-coupled nanoparticles, the active monomer, the initiation system, the plasticizer and the other additives are as follows by weight percentage in terms of solid content: 20 wt %~70 wt % of matrix resin, 5 wt %~15 wt % of active fluororesin, 1 wt %~5 wt % of silane-coupled nanoparticles, 10 wt %~40 wt % of active monomer, 2 wt %~7 wt % of initiation system, 3 wt %~7 wt % of plasticizer and 0.5 wt %~1 wt % of other additives.

In some embodiments, the matrix resin is selected from at least one of polyvinyl acetate, polyvinyl butyral, copolymers of polyvinyl butyral and cellulose acetate, polyisoprene, polybutadiene, polystyrene, polyvinylpyrrolidone, polychloroprene, triacetyl cellulose.

In some embodiments, the active fluororesin is an allylic active fluororesin of Structural Formula 1 or a methacryloxy active fluororesin of Structural Formula 2.

Structural Formula 1-Ally (m = 1~3, n = 3~5)

Structural Formula 2-Methacryloyloxy (m = 1~3, n = 3~6)

In some embodiments, the coupled nanoparticles are at least one of coupled nano-alumina, boron nitride and silicon oxide, and the particle size of the coupled nanoparticles is 10~15 nm.

In some embodiments, the active monomer is an acryloxy acrylate-containing monomer including: at least one of liquid monomer or solid monomer, the liquid monomer being one of diethylene glycol diacrylate, glycerol triacrylate, ethylene glycol dimethacrylate, pentaerythritol triacrylate, 2-phenoxyethyl acrylate, 2-(p-chlorophenoxy ethyl methacrylate), and 1,6-hexamethylene bisacrylamide; the solid monomer is at least one of 2,4,6-tribromophenyl acrylate, pentachlorophenyl acrylate, 2-naphthyl acrylate, 2-(2-naphthoxy) ethyl acrylate and N-vinyl carbazole.

In some embodiments, the initiation system includes, by mass: 0.5 wt %~4 wt % of photoinitiator, 0.005 wt %~0.2 wt % of photosensitizer and 2 wt %~4 wt % of chain transfer agent, wherein the photoinitiator is at least one of 2-(o-chlorophenyl)-4,5-bis (m-methoxyphenyl) imidazole, 2,2'-bis (o-chlorophenyl)-4,4',5,5'-tetraphenyl 1,1'-diimidazole, 2,5-bis (o-chlorophenyl)-4,4'-dimethylphenyl-1H-imidazole, 9,10-anthraquinone, 2-ethylanthraquinone, 2-tert-butylanthraquinone, α-methylbenzoin and α-phenylbenzoin.

The photosensitizer is at least one of cyanine dye, indole cyclopentyl dye, 2,5-bis {[4-(diethylamino)-2-methylphenyl]-methylene}cyclopentanone, 2,5-bis{[4-(diethylamino)phenyl]methylene}cyclopentanone, and 2,3-dihydro-5,6-dimethoxy-2-[(2,3,6,7-tetrahydro-1H,5H-benzoquinoline)methylene]-1H-indan-1-one.

The chain transfer agent is at least one of 4-methyl-4H-3-mercapto-1,2,4-triazole, 2-mercaptobenzoxazole and 2-mercaptobenzothiazole.

In some embodiments, the plasticizer is at least one of triethylene glycol diacrylate, triethylene glycol Di-2-ethylhexoate, diethyl adipate, triethylene glycol diacetate, polyethylene glycol, and polyethylene glycol methyl ether.

In some embodiments, the solvent is a mixed solvent of butyl acetate, dichloromethane, butanone and methanol, and the volume ratio of the butyl acetate, the dichloromethane, the butanone and the methanol is (4~5.5):(0.5-~2):(0.5~2): (0.5~1.5).

In some embodiments, the other additives include: nonionic surfactant, thermal stabilizer, optical brightener, and the nonionic surfactant is at least one of polyethylene oxide and fluorinated nonionic surfactant, the thermal stabilizer is at least one of hydroquinone, p-methoxyphenol, β-naphthol and phenothiazine, and the optical brightener is 7-(4'-chloro-6'-diethylamino-1',3',5'-triazine-4'-amino)-3-phenylcoumarin.

In some embodiments, when the light absorbing layer is included in the display apparatus, after step S2, a step of forming the light absorbing layer is further included; and the step of forming the light absorbing layer may be performed before step S3 or after step S3.

It should be understood that above embodiments are just examples for illustrating the principle of the present disclosure, however, the present disclosure is not limited thereto. Various modifications and variations can be made by a person skilled in the art without departing from the scope of the present disclosure. These modifications and variations should be considered to be within protection scope of the present disclosure.

What is claimed is:

1. A display apparatus, comprising: a display panel and a functional substrate that is located on a light exit side of the display panel, the functional substrate comprising:
    a transparent substrate configured to have a first total reflection angle on an inner surface of a side far from the display panel;
    a specular reflection layer located on a side of the transparent substrate; and
    a holographic film layer located between the transparent substrate and the specular reflection layer and configured so that a part of incident light, of which a propagation direction faces towards the transparent substrate and an incident angle is within a first incident angle range, is diffracted and is emitted to the transparent substrate at a first exit angle, the first exit angle being greater than or equal to the first total reflection angle.

2. The display apparatus according to claim 1, wherein a light absorbing layer is formed on a side surface of the transparent substrate.

3. The display apparatus according to claim 1, wherein an upper limit value of a first incident angle range is greater than or equal to a first total reflection angle.

4. The display apparatus according to claim 1, wherein a touch substrate and a cover plate are sequentially disposed on a light exit side of the display panel in a direction away from the display panel, the touch substrate comprising: a first base substrate and a touch function structure that is located on a side of the first base substrate close to the display panel;
    the specular reflection layer and the holographic film layer are located between the first base substrate and the cover plate, and the holographic film layer is attached to the cover plate; and
    the transparent substrate is the cover plate.

5. The display apparatus according to claim 1, wherein a touch substrate is disposed on a light exit side of the display panel, the touch substrate comprising: a first base substrate and a touch function structure that is located on a side of the first base substrate close to the display panel;
    the specular reflection layer and the holographic film layer are located on a side of the first base substrate far from the display panel, and the holographic film layer is attached to the first base substrate; and
    the transparent substrate is the first base substrate.

6. The display apparatus according to claim 1, wherein an encapsulation layer is disposed on a side of the functional substrate far from the display panel, the encapsulation layer comprising: a protective layer and/or a waterproof layer;
    wherein, when the encapsulation layer simultaneously comprises the protective layer and the waterproof layer, the waterproof layer is located on a side of the protective layer far from the display panel.

7. The display apparatus according to claim 4, wherein a light absorbing layer is formed on side surfaces of the cover plate, the holographic film layer, the specular reflection layer, and the touch substrate.

8. A smart mirror comprising: the display apparatus according to claim 1.

9. A preparation method for the display apparatus according to claim 1, comprising:
    preparing a display panel;
    preparing a functional substrate, the functional substrate comprising: a transparent substrate, a specular reflection layer and a holographic film layer, wherein the transparent substrate is configured to have a first total reflection angle on an inner surface of a side far from the display panel, the specular reflection layer is located on a side of the transparent substrate, the holographic film layer is located between the transparent substrate and the specular reflection layer and is configured so that a part of incident light, of which a propagation direction faces towards the transparent substrate and an incident angle is within a first incident angle range, is diffracted and is emitted to the transparent substrate at a first exit angle, the first exit angle being greater than or equal to the first total reflection angle; and
    assembling the functional substrate to the light exit side of the display panel.

10. The preparation method according to claim 9, wherein a step of forming the holographic film layer in the process of preparing the functional substrate comprises:

forming a photosensitive material layer on a side of the second base substrate; and irradiating the photosensitive material layer with object light and reference light, utilizing interference of the object light and the reference light to make the photosensitive material layer record a propagation direction of interference light thereof, wherein an included angle between the object light and a plane where the photosensitive material layer is located is maintained at the first exit angle, and an included angle between the reference light and the plane where the photosensitive material layer is located is gradually increased from a lower limit value of the first incident angle range to an upper limit value of the first incident angle range.

11. A preparation method according to claim 10, wherein in a process of preparing a functional substrate the transparent substrate is disposed on a side of the holographic film layer far from the second base substrate, and the specular reflection layer is disposed on a side of the second base substrate far from the holographic film layer.

\* \* \* \* \*